Jan. 5, 1954     J. F. GIFFORD ET AL     2,664,998
CONTAINER FOR NEUTRON-IRRADIATED MATERIAL
Filed Jan. 4, 1950

INVENTORS.
JOHN F. GIFFORD
NELSON B. GARDEN
BY
Roland A. Anderson
ATTORNEY.

Patented Jan. 5, 1954

2,664,998

UNITED STATES PATENT OFFICE 2,664,998

CONTAINER FOR NEUTRON IRRADIATED MATERIAL

John F. Gifford, Richland, Wash., and Nelson B. Garden, Berkeley, Calif., assignors to the United States of America as represented by the United States Atomic Energy Commission Application January 4, 1950, Serial No. 136,778

3 Claims. (Cl. 206—1)

This invention relates to hermetically sealed containers or receptacles adapted for use in the neutron irradiation of materials disposed therein and for the subsequent handling, storage or treatment of such irradiated materials. As is well known, the insertion of containers into nuclear reactors, removal of the same therefrom, and subsequent opening of the containers for removal of materials, is attended by novel and dangerous problems which must be recognized in the construction of the container assembly to be employed. Accordingly, it is an object of our invention to provide a new and improved container assembly adapted for safe use in the neutron irradiation of materials.

A second object is to provide a container assembly comprising a plurality of container elements each of which serves a complementary function contributing to the combined safe and expeditious handling of neutron irradiated materials.

Another object is to provide a new and improved primary inner container for neutron irradiated materials.

Another object is to provide a new and improved secondary inner container for the safehandling, by remote control means, of said primary container.

A further object is to provide a new and improved outer container for safehandling, by remote control means, of said primary and secondary containers.

Still another object is to provide a container assembly which is compact; is hermetically sealed in a plurality of zones; and is relatively inexpensive.

Other objects and advantages of the invention will become apparent to those skilled in the art when considered in conjunction with the following description and accompanying drawings in which.

Figure 3:
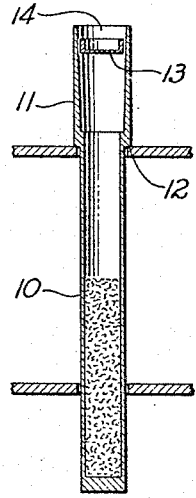
Fig. 3 is a longitudinal sectional view of the primary container

Referring first to the container shown in Fig. 3 and designated the "primary container," a preferred form which this may take comprises an elongated cylindrical hollow cup 10 provided with an enlarged upper extension portion 11 offset by a shoulder 12. Upper portion 11 preferably has a tapered, funnel like, inner surface adapted to receive a suitable expendable cap means 13. The primary container functions to hold the material, gaseous, solid or liquid, which is to be irradiated, and must be capable of treatment with strong and active chemical reagents. At the same time it preferably should have a relatively small nuclear total cross section and be malleable. By making the container walls as thin as possible consistent with required mechanical strength and by choice of a material having a relatively low cross section in the range of neutron energies to be encountered, the total nuclear cross section may be reduced and thus the capture of neutrons by the container is minimized. Platinum serves these purposes and is a preferred material for the primary container, although the invention is not intended to be limited solely to this one material. Since an intensely radioactive zone exists within container 10 after its tenure in the nuclear reactor, precautions must be taken to prevent any escape of gas, dust or small particles as the container is being opened. Accordingly, as one important feature of our invention, the upper extension of the container is made sufficiently long so that a reservoir space 14 is provided above the cap 13, whereby a suitable reagent or material may be placed therein during the opening operation in order to submerge the contents of the primary container when the cap is punctured. During filling of the container or removal of the container contents, the shoulder 12 may abut against a suitable ledge of associated laboratory apparatus as shown diagrammatically in Fig. 3. Preferably the material to be irradiated is placed in the container while being held in this upright position and after the filling operation a thin platinum cap is pushed into the conically shaped opening in extension 11. Then by means of a suitable tool, a crimp is placed in the thin malleable wall above such cap thereby forming a hermetical seal for the zone below said cap. Use of the crimp, likewise, provides a convenient means for handling of the container by remote control means. As will be apparent, during the later opening of the container such cap may be punctured by a suitable tool and then be deformed sufficiently to be pulled outwardly through reservoir space 14. Since the platinum container is expensive and, after treatment with suitable reagents employed in removing its radioactive contents, is capable of reuse after lapse of a sufficient decay period for its radioactivity, the original crimp in the malleable upper wall may be straightened and thereafter the same primary container may be reused, a new cap 13 however being required.

Figure 1:
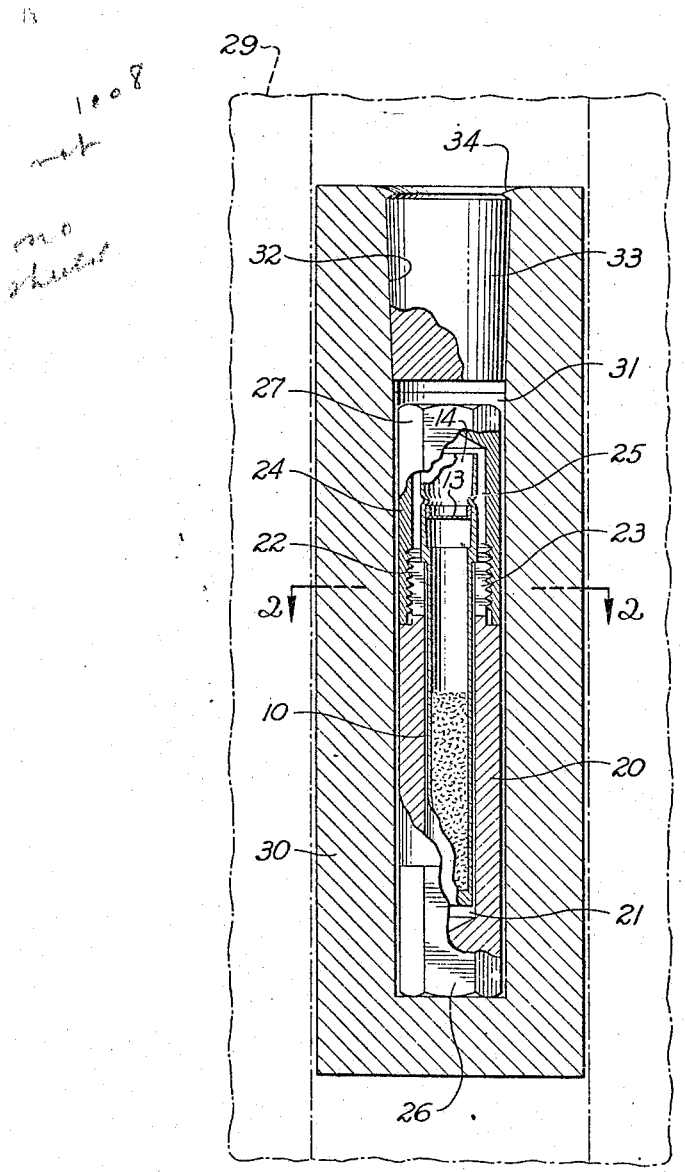
Figure 1 is a view partly in section showing the container assembly in position within a nuclear reactor.
Figure 2:
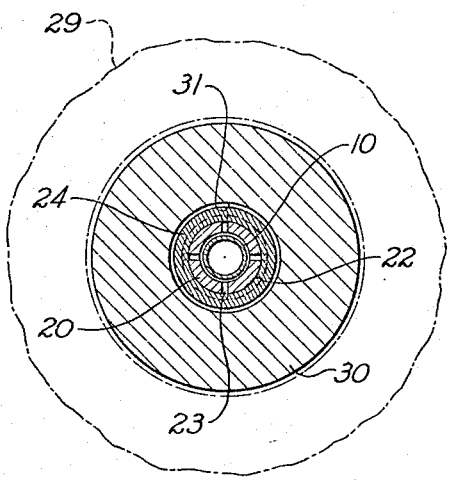
Fig. 2 is a section taken on line 2—2 of Fig. 1.

For retaining the thin wall primary container in place within the assembly, another container shown in Figs. 1 and 2 and designated the "secondary container" is provided. This container element serves the combined functions of providing mechanical strength for the thin primary container, for providing another hermetic seal in the container assembly and for providing for ease in manipulation of the "hot" articles by remote control apparatus after withdrawal from the nuclear reactor.

As best shown in Fig. 1, the secondary container comprises an elongated hollow lower portion 20 having therein a space 21 into which the primary container fits with close clearances, thereby to minimize the amount of gas which may become radioactive during irradiation of the assembly and to improve heat conduction between the primary and secondary containers. The lower portion 20 may be provided with a threaded portion 22 having a plurality of longitudinal slots 23 cut therein in order to prevent binding of the cooperating upper screw cap 24 due to expansion taking place under neutron bombardment or to the mutual binding effect of the two threaded portions of the same metal. Within the cap 24 a minimum space 25 suitable for accommodating the upper reservoir portion 11 of the primary container is provided. Upon assembly of the thus described apparatus a second hermetic seal is thus provided whereby the escape of any radioactive gas from the interior of the secondary container or of a radioactive material resulting from accident to the primary container is prevented. Since the second container is to be handled by remote control means, suitable configurations easily held by such means, as for example, cooperating knurling, or machined flat surfaces 26 and 27 may be provided, preferably at the extreme ends of the container.

It is desirable to employ a material for the secondary container which is inexpensive, light in weight and especially one which has a relatively low total neutron cross section. Aluminum serves these purposes and is preferred although the invention is not to be considered as limited to this one material.

For encasing the above described reusable portions of the container assembly, a suitable outer casing 30 which may be brought into contact with the nuclear reactor walls, indicated generally at 29, is provided. Such outer casing may be disposed within the reactor at any angle and is not to be considered as being used only in the vertical position as diagrammatically illustrated. The outer casing 30 preferably is formed of aluminum of appreciable thickness and may have an interior space 31 of dimensions suitable for the remainder of the container assembly but without an appreciable amount of excess space which would give rise to escape of radioactive gases. Space 31 however is intended to be of sufficient length to accommodate a saw blade or the like, later to be used in dismantling the expendable outer casing. At one end the outer casing is provided with a tapered portion 32 into which a plug 33 is adapted to be driven in order to provide a third hermetic seal for the container assembly. Plug 33 may be further secured in place by peening thereover a thin section 34 of the upper portion of the casing and, if desired, suitable identification symbols may be embossed on the exposed outer portion of the plug.

As shown, the thickness of the wall and plug elements of the casing which is in contact with the reactor structure is appreciably greater than the thickness aspects of the walls of either the secondary container or the primary container. In this way greater mechanical strength is provided in the event that heavy mechanical or other forces are applied to the outer casing thus further contributing to the safety features of the container assemblage.

Bearing in mind the above described container assembly it will be appreciated that, after a suitable period of bombardment within a nuclear reactor, the entire assembly is intended to be removed and handled under certain standard precautions. Upon removing the assembly using remote control means, the top portion of the outer casing 30 may be severed as by means of a saw, suitable disposal being made of the saw dust and the gases coming from interior space 31 as well as the two portions of the severed casing. Thereafter the secondary container may be transported to a laboratory installation and the cap 24 removed therefrom by remote control apparatus, the gas from the space 25 meanwhile being suitably handled. Thereafter the primary container 10 may be set upon a shelf in fixed position and the desired treatment conducted upon its contents.

As will be apparent many modifications of the above structure and procedures employed therewith may be made without departing from the broader aspects of our invention. The containers may be filled with blankets of special gases if desired, or may be assembled in evacuated condition, or may be constructed of geometrical shapes other than cylindrical. Such various modifications falling within the spirit and scope of the invention are intended to be covered thereby and the invention is not to be limited to the precise form as shown except as may be indicated by the appended claims.

What is claimed is:

1. A container assembly for radioactive materials adapted to be withdrawn from an expendible outer cylinder which is contaminated by contact with a nuclear reactor and comprising in combination, a relatively thick-walled, cylindrical container having an externally threaded, open end portion of reduced diameter connected to the outer, cylindrical wall of said container by an annular surface extending normally to the axis of the container, an inner cylindrical container of small nuclear total cross section closely disposed in said first container and having an external, annular shoulder seating on the open end of said first container, the portion of said inner container lying above said shoulder being formed with a conically tapered thin-walled inner bore, a puncturable cap positioned in said bore a sufficient distance from the open end thereof to provide a reservoir for a suitable reagent and retained therein by circular deformation of said bore immediately above said cap, and a hollow threaded cap engaging the open-end portion of said first container and seating against said annular surface to hermetically seal said first container.

2. For use in a nuclear reactor, a container for holding radioactive material and having a unitary, elongated hollow cup including a cup body and an interiorly and conically tapered axial extension terminating at the open end of said cup, the external transverse dimension of said extension being greater than the external transverse dimension of said body and the external axial dimension thereof extending below said tapered interior and joined to said body by an annular external shoulder extending normally to the axis of said cup, and a generally concave cap securely fixed in said tapered portion thereby to provide a hermetic seal for the contents of said container and retained therein by circular inward deformation of said extension immediately above said cap, the axial location of the latter being well below the upper end of said extension to provide a reservoir for a reagent to submerge the radioactive contents of said cup upon puncturing of said cap.

3. For use in a nuclear reactor, a container assembly for radioactive materials comprising an outer, thick-walled cylindrical container having a cylindrical bore extending axially for a major portion and continuing conically to the open end thereof and having also an axially elongated conical plug permanently closing the conical open end of said container, an intermediate, cylindrical container of less wall thickness than said outer container snugly disposed within said cylindrical bore and having an axially elongated screw cap threadedly engaging and hermetically sealing the open end of said intermediate container and an inner, thin-walled cylindrical container snugly disposed in said intermediate container, said inner container having an abrupt peripheral shoulder intermediate its ends and resting on a peripheral portion of said open end, and a closure for said inner container disposed substantially below the open end thereof to provide a reservoir thereabove.

JOHN F. GIFFORD.
NELSON B. GARDEN.

References Cited in the file of this patent

UNITED STATES PATENTS

| Number | Name | Date |
|---|---|---|
| Re. 11,517 | Justin | Dec. 10, 1895 |
| 331,844 | Thomas | Dec. 8, 1885 |
| 614,131 | Read | Nov. 15, 1898 |
| 1,632,309 | Nitardy | June 14, 1927 |
| 1,735,086 | Paxson | Nov. 12, 1929 |
| 1,878,709 | Kerr | Sept. 20, 1932 |
| 2,008,586 | Kramer et al. | July 16, 1935 |
| 2,284,551 | Alexander | May 26, 1942 |
| 2,301,710 | Soudder | Nov. 10, 1942 |

FOREIGN PATENTS

| Number | Country | Date |
|---|---|---|
| 508,043 | France | Sept. 29, 1920 |
| 536,152 | Great Britain | May 5, 1941 |